Figure 1:
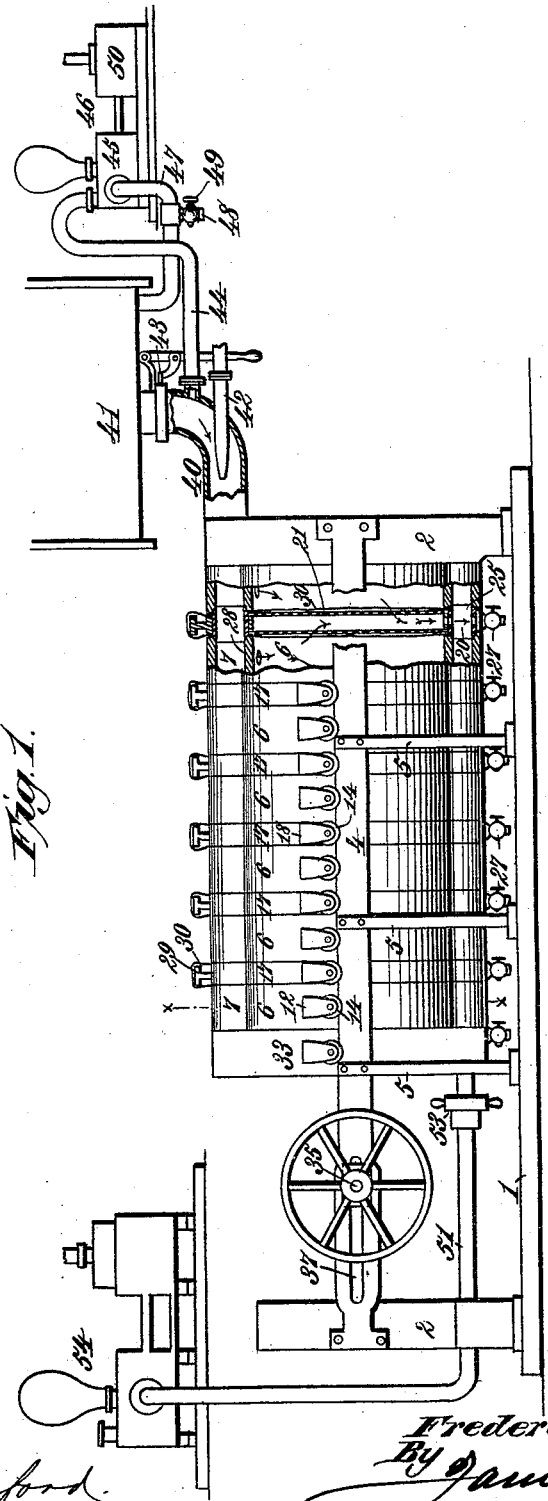

(No Model.) 2 Sheets—Sheet 1.

F. W. WIESEBROCK.
FILTER PRESS.

No. 459,326. Patented Sept. 8, 1891.

Witnesses:
Robert Everett
J. A. Rutherford

Inventor:
Frederick W. Wiesebrock
By James L. Norris
Atty (No Model.) 2 Sheets—Sheet 2.
F. W. WIESEBROCK.
FILTER PRESS.
No. 459,326. Patented Sept. 8, 1891.
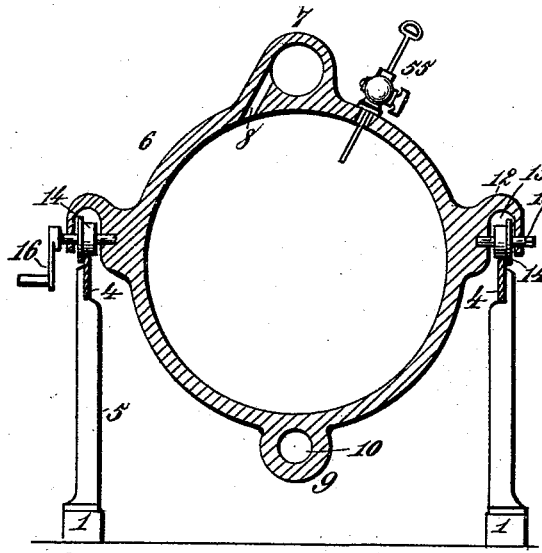
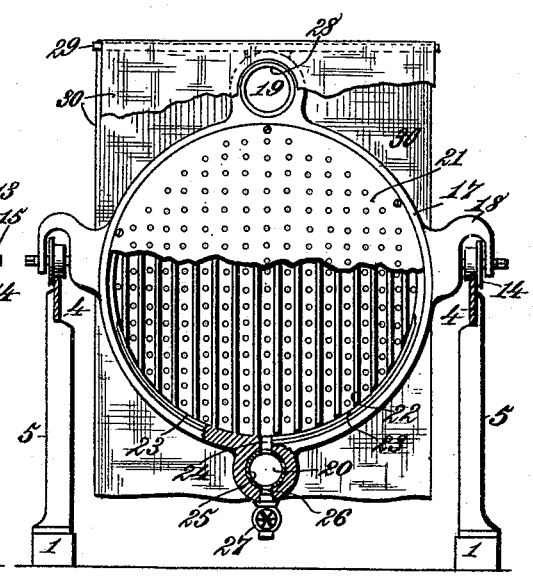
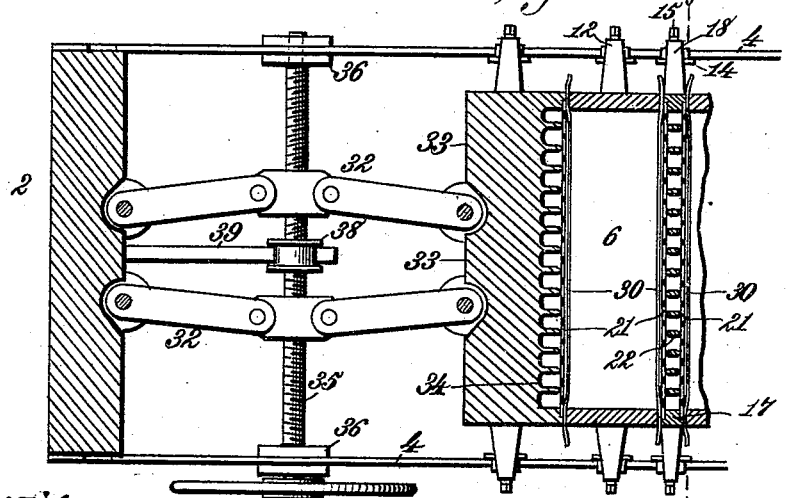
Witnesses.
Inventor:
Frederick W. Wiesebrock
By James L. Norris.
Atty.

UNITED STATES PATENT OFFICE.

FREDERICK W. WIESEBROCK, OF NEW YORK, N. Y.

FILTER-PRESS.

SPECIFICATION forming part of Letters Patent No. 459,326, dated September 8, 1891.

Application filed February 14, 1891. Serial No. 381,509. (No model.)

*To all whom it may concern:*

Be it known that I, FREDERICK W. WIESEBROCK, a citizen of the United States, residing at New York, in the county of New York and State of New York, have invented new and useful Improvements in Process and Apparatus for Filtering Liquids, of which the following is a specification.

My invention relates to the art of separating liquids and solids which are mechanically mingled, and the purpose thereof is to provide means by which the separation may be freely and rapidly carried on with a material economy of time and labor and with better and more uniform results.

It is my purpose, also, to provide a novel apparatus whereby said method may be readily and rapidly carried into effect, the temperature controlled, the pores of the filtering cloths or diaphragms cleansed and prevented from choking, the distribution over the filtering-surfaces rendered uniform, and the process of separation rendered continuous.

The invention consists to these ends in the novel method or process and in the apparatus for carrying the same into effect, as hereinafter fully described, and then more particularly pointed out and defined in the claims which follow this specification.

To enable others skilled in the art to make and use my said invention, I will describe the same in detail, reference being had to the accompanying drawings, showing a form of apparatus especially adapted to the purposes in view, in which—

Figure 1 is a side elevation of a press embodying the mechanical features of my invention, a portion being broken away to show the interior construction in section. Fig. 2 is a transverse section upon the line $x$ $x$ of Fig. 1. Fig. 3 is a similar section upon the line $y$ $y$, Fig. 4. Fig. 4 is a horizontal section of the end of Fig. 1, a portion only of the filtering-press being shown in this figure.

In the said drawings, the reference-numeral 1 denotes the base or bed-plate of the press, from which rises at one end the head 2, which is connected with a similar head 3 at or near the other end of the bed-plate by means of horizontal rails 4, bolted to the sides or vertical edges of the heads and supported at intervals by stanchions 5.

Upon the rails 4, which are preferably formed of flat plates of metal or other suitable material, are supported the separable press-sections, which are each duplicates of all the others, and may be of any number, according to the size of the press. I have shown these press-sections as being cylindrical, though they may be of any other suitable form. Each section consists of a transverse divided portion 6 of the cylinder, having at or upon its upper portion a section of tube 7, which communicates with the interior by means of a tangential channel 8, which is inclined toward one side of the cylindrical section. At the bottom, and preferably diametrically opposite the upper tubular section, is a lower and somewhat similar section 9, containing an opening 10. Upon the opposite sides of each press-section are formed projections 12, containing undercut vertical channels 13, which receive the flanged wheels 14, that support the press-section upon the rails 4. Upon both sides of each press-section the journals 15 of the wheels are prolonged, and the projecting ends are squared to enter the sockets of cranks 16.

Between the several press-sections are placed the filter-sections, each consisting of a narrow section of a cylinder, or, in other words, a ring 17, having equal diameter with the press-sections and provided with similar lateral arms 18, giving bearing to the wheels by which it is independently supported upon the rails 4. At top and bottom, also, it is provided with bosses containing upper and lower tubular openings 19 and 20, respectively, each having a diameter equal to that of the corresponding openings at top and bottom of the press-sections.

Each filtering section or ring is provided upon each of its vertical edges with a circular metallic plate 21, fitting within a rabbeted channel and fastened by screws passing through its edges, the outer face of each plate forming a flush surface with the edge of the ring. These plates are provided with small perforations at close intervals, and they are connected by vertical bars or grates 22, the vertical edges thereof being wedge-shaped and arranged in such manner that the reduced edges lie between the vertical rows of perforations in the plates 21.

In each ring a channel 23 is formed in the inner face thereof, having communication with an opening 24 at the bottom of the ring, which communicates with the lower tubular opening 20. In this opening is placed a bushing 25, the ends thereof projecting equally and having an outer bevel to enter the correspondingly flared or countersunk openings 10 in the press-sections. This bushing is provided with an opening registering with the opening 24 and a lower opening communicating with an opening 26, in which is tapped a suitable cock 27. The channel 23 extends over about ninety degrees of arc upon each side of the opening 24, with which it communicates, the purpose of said construction being shown hereinafter.

The supply of the unfiltered fluid to the press-sections is also aided by my invention, since the tangential passages 8, which discharge from the sides of the tubular sections 7 instead of from the bottom thereof, give a much more uniform distribution of the solid matter throughout the several press-sections than would otherwise be possible. After these sections are filled the flow through the tubular sections 7 is slow, and if the discharge took place at the bottom the solid matter would have time to settle and the larger portion would enter the first press-section, but little reaching the last. By my construction, however, this is avoided and a substantial uniformity of distribution is effected.

The purpose of the bushings 25 and 28 is to hold the filter-cloths in proper position during the closing of the press, as without this means the filter-cloth needs fastening with screws or some suitable device to retain it in the proper position to form a tight joint when closing the press.

As the filter-cloths need cleansing and washing after every or nearly every filtration, it is my object to do this by pumping clean hot water through the press and backward through the filter-cloth before a new filtration is made.

During the process of opening, emptying, and closing the press, the bushings will hold the filter-cloths in proper condition, acting as a clamp to the cloth after the same has been fitted over the bushings once.

The lateral or tangential openings in the upper or charging channel have a twofold function. First the material to be filtered, especially distillery-slops, is filtered hot, and if the opening in each press-section was at the bottom of the channel it would permit the heavy particles of the slops to deposit in the front chambers or in the first press-sections reached, thereby passing the liquid matter containing the most gluten forward into the press-chambers farther on and depriving these press-chambers of the fibrous matter contained in such a degree that when the first few press-chambers are full of the more solid and fibrous materials the succeeding chambers have their filter-cloths glued up with gluten to such an extent as to prevent the passage of the liquid through the cloths. When the press is finally opened, it is often found that not more than one-third of the press-chambers are filled with solids, and thus the object in view is frustrated, because the liquid in the other chambers dumps again into the fibrous mass in the front chambers.

When the discharge-openings are placed in the filling-channel above the press-chambers and arranged tangentially or sidewise, the solid matter in the fluid cannot drop through the front openings into the first few press-chambers, but must move along through the whole length of the filling-channel, the lateral discharge-openings giving the mass in said channel a spiral motion, thereby distributing the solid matter throughout the different press-chambers, and thus sufficient fiber is carried along at the outset of the process of filtration to prevent a clogging of the filter-cloths by the gluten.

What I claim is—

1. A filtering-press composed of press-sections alternating with filtering sections or rings, the press-sections being provided with separate bosses having passages, one of which discharges into the press-section, and the filter-sections having like bosses provided with passages having bushings projecting in opposite directions, the lower bushings having discharge-openings communicating with cocks, substantially as described.

2. A filtering-press consisting of separable press-sections having rolls journaled in supports upon their sides and resting on horizontal rails, filtering sections or rings alternating with the press-sections and having a similar support, each press-section having an upper and lower tubular section, the former having a tangential and lateral discharge-opening, and both sections receiving the ends of bushings fitting in the upper and lower tubular sections in the filtering sections or rings, which are provided with perforated plates having bars or grates between the inclosed space, discharging through openings in the lower bushing, a reservoir or tank for unfiltered liquid communicating by a pipe with the upper tubular sections, a pump arranged above the level of the press and having a suction-pipe communicating with the lower tubular sections, filtering-cloths hanging over both perforated plates in the filtering-rings and having openings for the bushings, and means for closing the separable sections with force, substantially as described.

3. In a filter-press, the combination, with a series of press-sections movable upon a horizontal support, of a series of filter-sections arranged between the press-sections and provided with bushings having beveled ends, each of the press-sections provided with outwardly-beveled openings adapted to receive the beveled ends of the bushings, and filter-cloths suspended from supports on the filter-sections and provided with openings, through which the bushings pass, substantially as described.

In testimony whereof I have hereunto set my hand and affixed my seal in presence of two subscribing witnesses.

FREDERICK W. WIESEBROCK. [L. S.]

Witnesses:
THEODORE J. SWANSEA,
JACOB V. D. ROOVAART.